United States Patent [19]
Hurlburt et al.

[11] 4,048,862
[45] Sept. 20, 1977

[54] LINKAGE FOR CONTROLLING TWO INDEPENDENT POWER UNITS

[75] Inventors: Joseph C. Hurlburt, Leola; Howard R. Brown, Nottingham; Ernest E. Buck, Reamstown, all of Pa.

[73] Assignee: Sperry Rand Corporation, New Holland, Pa.

[21] Appl. No.: 622,189

[22] Filed: Oct. 14, 1975

[51] Int. Cl.² .................................... F16H 25/12
[52] U.S. Cl. ............................................. 74/57
[58] Field of Search .......................... 74/54, 22 R, 57

[56] References Cited
U.S. PATENT DOCUMENTS

| | | | |
|---|---|---|---|
| 313,565 | 3/1885 | Whitbeck | 74/54 |
| 2,641,418 | 6/1953 | Miller | 74/54 |
| 2,903,895 | 9/1959 | Larsen | 74/54 |
| 3,170,330 | 2/1965 | Reinecke | 74/54 |
| 3,662,611 | 5/1972 | Knoll | 74/22 R |
| 3,886,789 | 6/1975 | Brookfield | 74/22 R |

Primary Examiner—Samuel Scott
Assistant Examiner—Wesley S. Ratliff, Jr.
Attorney, Agent, or Firm—Michael R. Swartz; Frank A. Seemar; John B. Mitchell

[57] ABSTRACT

A linkage is provided to simultaneously control two independent hydraulic drive motors for a vehicle, each having a control arm movable between a high speed position and a low speed position. The linkage comprises a control shaft having a pair of spaced-apart cam elements mounted thereon which engage each of the control arms to pivot them in opposite direction as the shaft is rotated. The linkage is also movable in an axial direction which thereby insures that both control arms reach corresponding high or low speed positions. For instance, if one control arm should reach a respective position prior to the time the other control arm reaches its corresponding position, further rotation of the shaft and cam elements therewith also results in axial movement thereof thus insuring that such other control arm reaches its corresponding position.

8 Claims, 3 Drawing Figures

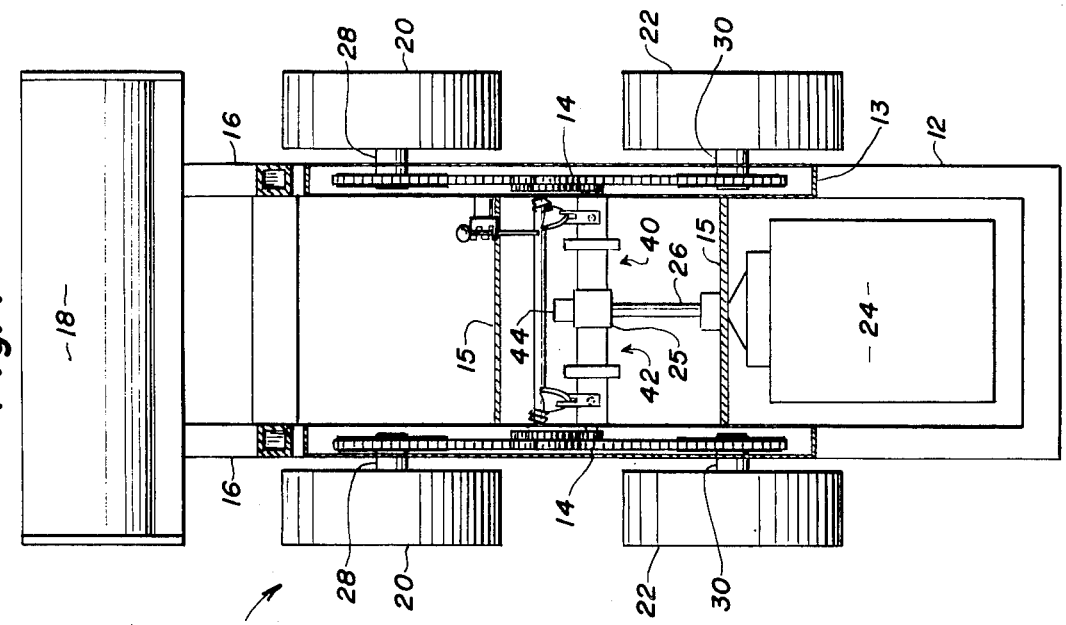

LINKAGE FOR CONTROLLING TWO INDEPENDENT POWER UNITS

BACKGROUND OF THE INVENTION

The present invention relates to hydrostaticly driven vehicles and is particularly directed to a linkage for controlling two independent hydraulic drive units.

Hydrostatic drive systems are in common use on all sorts of vehicles, as shown by the following U.S. Pat. Nos. 3,810,571 (loader), 3,581,497 (mower-conditioner), and 3,880,251 (trencher). Many of these vehicles have two speed ranges, a high range for road travel and a low range for working conditions. A common means used to provide these vehicles with both high and low speed ranges is a two speed motor or motors, typically being a variable displacement motor of the conventional axial-piston type. This type of motor has an internal swash plate whose angle may be varied to change the stroke of internal pistons and thereby vary the outut speed of the motor. To establish desired high and low speed ranges for the motor, some type of stops, either internal or external to the motor, are provided to define predetermined displaced positions for the swash plate. Thus, when the swash plate is held against one of the stops, the motor would be in the high speed range and when the swash plate is held against the other stop, the motor is in the low range. The swash plate is moved between the high and low speed stops by a control arm connected to a pintle shaft about which the swash plate pivots.

The swash plate is subjected to extremely high pressures exerted thereon by the reciprocating action of the pistons. Consequently, if the swash plate is not held firmly against the stop, the swash plate will vibrate and thus cause wear which results in costly repairs. This vibration also creates a disturbing noise sometimes referred to as chatter.

The above-described problem predominately occurs when two or more independent motors are to be controlled simultaneously. Because of manufacturing tolerances of the motors and associated control arms, the control arm of one motor may have to be pivotally moved through a different angular displacement than that of the control arm of another motor in order for the swash plate of each motor to reach its respective stop. Up until now, no satisfactory linkage has been provided which enables the control arm and therewith the swash plates of two or more independent motors to be simultaneously moved and held firmly against their respective stops.

SUMMARY OF THE INVENTION

The present invention in its preferred application described hereinafter permits each swash plate of two or more independent motors to be moved to and held firmly against respective stops and thereby eliminate vibration of either of the swash plates which causes chatter and mechanical wear of the swash plate. While the invention is set forth in application to multiple motors of a hydrostatic drive system, it will be readily apparent that it is suitable for use in connection with other systems involving simultaneous control of various multiple power units.

Accordingly, the present invention sets forth a simple and unique linkage for controlling two or more independent power units disposed in a predetermined alignment. Each power unit has a control arm movable between first and second positions. The operation of the power units are changed by moving the control arms between respective positions. The linkage provided enables an operator, through the use of a single selector handle to simultaneously control the operation of each independent power unit. Further, the linkage insures that when one control arm reaches a predetermined position, the other control arm will also reach a corresponding position.

The linkage generally comprises a shaft substantially parallel to the aligned power units, the shaft being mounted for rotational and axial movement relative to the power units. Projecting from the shaft are means that engage the control arms of the power units and rotate with the shaft to move the arms between first and second positions as the shaft is rotated. Should one of the control arms reach a position prior to the time the other control arm reaches a corresponding position, then further rotation of the shaft and projecting means also causes them to move axially and thereby insures that each control arm will reach its corresponding position.

Further, the means that project from the shaft comprise a pair of spaced-apart oppositely inclined spiral cam surfaces. Each of these surfaces are engagable with a corresponding control arm so that as the shaft and the cam surfaces therewith are rotated, the control arms move in opposite directions.

These and other advantages and attainments of the present invention will become apparent to those skilled in the art upon reading of the following detailed description when taken in conjunction with the drawings wherein there is shown and described an illustrated embodiment of the invention.

BRIEF DESCRIPTION OF THE DRAWINGS

In the course of the following detailed description, reference will be frequently made to the attached drawings in which:

FIG. 1 is a top plan view of a loader with portions omitted in order to show the loader drive means which incorporates the linkage of this invention;

FIG. 2 is an enlarged fragmentary plan view of the loader of FIG. 1, showing the linkage and associated drive components; and FIG. 3 is a view similar to FIG. 2, but showing an alternative embodiment of the linkage.

Detailed DESCRIPTION OF THE INVENTION

In the following description, right hand and left hand references are determined by standing at the rear of the machine facing in a direction of forward travel. Also, in the following description, it is to be understood that such terms as "forward", "rearward", "left", "upwardly", etc., are words of convenience and are not to be construed as limiting terms.

IN GENERAL

Referring now to the drawings, and particularly to FIG. 1, there is shown a self-propelled loader, being indicated generally by the numeral 10, which incorporates the preferred embodiment of the present invention. While the invention is illustrated in a loader, it should be understood that it may be readily adapted for use with other types of vehicles or machines as desired.

The loader 10 is provided with a frame 12 which includes a pair of laterally spaced longitudinal hollow frame members 13 that each house a chain drive mechanism 14 and further includes cross members 15 that add rigidity to frame 12. A pair of boom arms 16, having a material handling bucket 18 attached to the forward ends thereof, are pivotally mounted on each side of frame 12. The boom arms 16 are raised and lowered by a pair of lift cylinders (not shown) interconnected between the frame 12 and each boom arm 16. The vehicle thus far described is of well-known construction and in and of itself, does not comprise the instant invention. Hence, in the interest of brevity, further detail showing and description thereof is omitted. A thorough understanding of the construction and operation of this type of loader can be gained from a reading of U.S. Pat. No. 3,215,292 granted to L. M. Halls, assigned to the present assignee.

HYDROSTATIC DRIVE SYSTEM

The vehicle 10 is supported by front and rear drive wheels 20,22 at opposite sides of the frame 12 and driven by means of a prime mover in the nature of an internal combustion engine 24 suitably mounted on the frame 12 at the rear end of vehicle 10. The engine 24 has a drive shaft 26 extending forwardly therefrom which drivably connects engine 24 to a gearbox 25. An operator's station and seat (not shown) is suitably mounted laterally across the frame 12 and spaced above drive shaft 26.

The wheels 20,22 are mounted on respective driven shafts 28,30, the latter being journalled in bearings (not shown) mounted on frame 12. The driven shafts 28,30 are operably connected by respective chain drive mechanisms 14 to respective drive sprockets 32,34 keyed to respective output shafts 36,38 of respective hydrostatic transmissions 40,42 which are suitably mounted in alignment laterally across a middle portion of frame 12. The gearbox 25, drivably connected to engine 24 by drive shaft 26, drives right and left hydrostatic transmissions 40,42 respectively, and also drives supplemental pump 44 which is used for various functions, such as charging and cooling the hydrostatic transmissions. In summary, therefore, power supplied by engine 24 is transmitted through drive shaft 26 to gearbox 25 which drives both hydrostatic transmissions 40,42 to rotate respective outut shafts 36,38 and associated drive sprockets 32,34 which engage respective chain mechanisms 14 and thus rotate drive wheels 20,22. A more detailed appreciation and an understanding of this drive system can be gained from reading U.S. Pat. No. 3,810,517, granted to Hurlburt et al., also assigned to the present assignee.

The hydrostatic transmissions 40,42 are identical, except that one thereof is right hand and the other is left hand for convenience of installation. The hydrostatic transmissions comprise variable displacement pumps 40A,42A, variable displacement motors 40B,42B and fluid transfer housings 40C,42C respectively. The hydraulic pumps 40A,42A and motors 40B,42B are of the aforementioned axial-piston type which utilize rotating cylinders and axially movable pistons which engage swash plates, the hydraulic transmissions 40,42 being preferably the type manufactured and sold by the Cessna Fluid Division of Cessna Aircraft Co. Hutchinson, Kan., and identified as series 77140, back-to-back motor pump assemblies. These units are well-known in the industry. Hence, in view of the fact that the transmissions 40,42 in and of themselves do not comprise the instant invention, detail showing and description thereof is omitted in the inerest of brevity. In a like manner, the fluid flow and fluid connecting lines are also omitted. It should suffice to state that the pumps 40A,42A are actuated by a pair of operating levers (not shown) disposed on each side of the operator's station to direct fluid to the motors 40B,42B so as to impart either forward or reverse rotation to the motors in a manner commonly understood in the industry. Such operating levers are basic in a conventional skid-steer type of vehicle.

The variable displacement motors 40B,42B, such as in the above identified Cessna units, contain internal stops (not shown) that define predetermined angular displaced positions for the swash plates (not shown) which represent high and low speed ranges. As shown by FIG. 2, the swash plates of respective motor 40B,42B are controlled by respective control arms 50,51 connected to respective pintle shafts 52,53. For the sake of clarity, positions HA,HB, representing the high speed range, and positions LA,LB, representing the low speed range, have been shown in FIGS. 2 and 3 of the drawings to illustrate the respective predetermined displaced positions of the respective internal stops to and against which the motor swash plates are moved and held. For sake of clarity, it will be assumed that HA,LA and HB,LB approximate the extreme positions to which the respective control arms 50,51 will be moved. Thus, it can be seen that the motors 40B,42B are either placed in the high range or the low range, by movement of the respective control arms 50,51 between respective HA,LA and HB,LB positions.

CONTROL LINKAGE

To insure that each of the control arms 50,51 of respective motors 40B,42B are generally simultaneously moved between and held at its respective aforementioned positions, a control linkage 54, as generally seen in FIG. 1 and shown in detail in FIG. 2, is provided which constitutes the preferred form of the present invention. Linkage 54 comprises a shaft 56, right and left cam elements 58,60, and selector handle 62. The shaft 56 extends laterally across frame member 12 and is disposed forwardly and substantially parallel to aligned hydrostatic transmissions 40,42. Collars 64,66, respectively mounted on and extending through opposite sides of frame 12 and journalled with opposite ends of shaft 56, support shaft 56 for both axial and rotational movement. Projecting from shaft 56 and spaced inwardly from respective opposite ends thereof are right and left oppositely inclined cam elements 58 and 60 respectively. The cam elements 58,60 preferably have oppositely spiraling configurations and extend approximately 180° about shaft 56. The shaft 56 and therewith cam elements 58,60 are held in axial alignment with respect to transmission 40,42 by a pair of springs 68 and 70, each coiled around opposite ends of shaft 56 and confined in a state of compression between respective collars 64,66 and cam elements 58,60 as viewed in FIG. 2.

Each of the control arms 50,51, as seen in FIG. 2, is provided with a bifurcated end to receive respective cam elements 58 and 60. The peripheral portions of the respective cam elements 58,60 are held in confined relationship with the respective bifurcated ends of the control arms 50,51 by fastening means 72 such that upon oscillation or turning of the shaft 56 and therewith cam elements 58,60, the confined peripheral portions thereof cause the bifurcated ends to move along a path generally aligned parallel to shaft 56 and thereby pivotal movement of control arms 50,51 on pintle shafts 52,53 between the respective predetermined positions HA,LA and HB,LB.

On the right side of the operator's station, a selector handle 62 is provided for shifting the hydraulic motors 40B,42B from one range to the other (high speed, low speed). The selector handle 62 is mounted on the right end of shaft 56, inwardly from cam element 58, and projects upwardly to engage with notches 76,78 of bracket 74 which is suitably mounted on frame 12. A coil spring 80, extending from selector handle 62 to a tab on bracket 74 urges the selector handle 62 firmly against notches 76,78. The notches 76,78 of bracket 74 represent a low speed and a high speed range respectively and are so positioned to permit control arms 50,51 to be moved between their respective positions HA,LA and HB,LB.

As seen in FIG. 2, the motors are each in the high speed range, the swash plate of each (not shown) being held firmly against internal stops (not shown) represented by respective positions HA and HB. As shaft 56 is rotated or turned by selector handle 62 in a clockwise direction, cam elements 58 and 60 are also rotated therewith, causing respective control arms 50,51 to move in opposite directions toward positions LA,LB. If the right control arm 50 reaches position LA before the left control arm 50 reaches respective position LB, upon further movement of shaft 56 and cam elements 58,60 therewith in a clockwise direction, the shaft 56 and cam elements 58,60 also move axially to the left, thus permitting left control arm 51 to reach respective position LB, while right control arm 50 is maintained at its position LA.

Another embodiment of the control linkage 54 of the present invention is shown in FIG. 3 which is generally similar to the above-described preferred embodiment except that a pair of spaced-apart cam elements 58A,58B and 60A,60B defining respective channels 58C and 60C therebetween are each disposed inwardly from respective ends of shaft 56 and enagagable with respective control arms 50,51 of motors 40B,42B. The free ends of the control arms 50,51 are received or confined by channels 58C,60C and thereby follow the path defined by these channels as shaft 56 is rotated in a clockwise and counterclockwise direction to impart movement of control arms 50,51 between the above-described respective positions.

It is thought that the invention and many of its attendant advantages will be understood from the foregoing description and it will be apparent that various changes may be made in the form, construction and arrangement of the parts of the linkage described without departing from the spirit and scope of the invention or sacrificing all of its material advantages, the form hereinbefore described being merely a preferred or exemplary embodiment thereof.

Having thus described the invention, what is claimed is:

1. Linkage for controlling at least two independent power units disposed in a predetermined alignment, said power units having first and second control arms moveable between first and second predetermined positions for changing the operation of said units, said linkage comprising:
   a. a shaft disposed substantially parallel to the aligned power units;
   b. means for mounting the shaft for rotational and axial movement relative to said power units;
   c. drive means for turning said shaft about its longitudinal axis; and
   d. means projecting from said shaft and slideably engaging each of said first and second control arms, said projecting means being skewed relative to the longitudinal axis of said shaft such that upon turning of said shaft in a clockwise direction by said drive means said first and second control arms are moved toward one of said predetermined first and second positions respectively and upon turning of said shaft in a counterclockwise direction said first and second control arms are moved toward the other one of said predetermined first and second positions;
   e. should one of said control arms reach one of said predetermined positions prior to the time the other control arm reaches its corresponding predetermined position then upon further turning of said shaft said projecting means slides on said control arm which has reached its predetermined position and thereby forces the shaft to move axially causing the other control arm to reach its predetermined position.

2. Linkage as described in claim 1, wherein said mounting means further comprise means for resiliently disposing said shaft in a predetermined axial position with respect to said mounting means.

3. Linkage as described in claim 1, wherein, said projecting means comprise a pair of spaced-apart inclined cam elements mounted on a portion of said shaft, said cam elements being engagable with the control arms of said power units.

4. Linkage as described in claim 3, wherein, said cam elements are oppositely inclined such that upon rotation of said shaft said control arms are moved in opposite directions.

5. Linkage as described in claim 4, wherein, each of said control arms have a bifurcated end, each cam element being in register with a corresponding bifurcated end.

6. Linkage as described in claim 1, wherein, the projecting means comprise:
   first and second pairs of spaced apart cams disposed on said control shaft, each pair being engagable with a corresponding control arm so that each of said control arms follow the path taken by the respective cam pairs as the projecting means is rotated.

7. Linkage as described in claim 6, wherein, said cam pairs are skewed in opposing directions with respect to said shaft.

8. An apparatus as described in claim 7, wherein, each cam pair forms a channel for receiving a control arm therebetween.

* * * * *